United States Patent [19]

Harrison

[11] 4,057,811
[45] Nov. 8, 1977

[54] QUENCH STROBE WITH PREDETERMINED QUENCH RATE

[75] Inventor: George C. Harrison, Chelmsford, Mass.

[73] Assignee: Polaroid Corporation, Cambridge, Mass.

[21] Appl. No.: 720,005

[22] Filed: Sept. 2, 1976

[51] Int. Cl.² .............................................. G03B 15/05
[52] U.S. Cl. ...................................... 354/33; 354/145; 315/241 P
[58] Field of Search ................... 354/32, 33, 34, 60 F, 354/145; 315/151, 155, 241 P, 241 S

[56] References Cited
U.S. PATENT DOCUMENTS

3,716,752  2/1973  Irreata ............................. 354/145 X
3,779,142  12/1973 Yata et al. ........................ 354/32 X
4,008,481  2/1977  Whiteside ......................... 354/32 X Primary Examiner—L. T. Hix
Assistant Examiner—M. L. Gellner
Attorney, Agent, or Firm—Edward S. Roman

[57] ABSTRACT

A quench strobe is provided with a resistor for effecting the quenching thereof at a predetermined rate which controls the amount of exposure influencing artificial illumination emitted subsequent to the quench trigger signal so that such exposure influencing artificial illumination closely correlates to the amount of exposure influencing illumination normally expected subsequent to the command signal to close the camera shutter blade elements and automatically anticipated by the camera exposure control system.

8 Claims, 8 Drawing Figures

QUENCH STROBE WITH PREDETERMINED QUENCH RATE

BACKGROUND OF THE INVENTION

1. Field of the Invention

This invention relates generally to a quench strobe having a predetermined quench rate and, more particularly, to a quench strobe wherein the quench rate is predetermined to increase the exposure at the film plane by an amount substantially approximating the additional exposure normally incurred during the shutter blade closing time when the scene is illuminated under generally steady state lighting conditions.

2. Description of the Prior Art

Electronic photograhic strobe devices of the type in which the flashlight produced by the flash tube of the device is automatically terminated after a predetermined quantity of light has been received from the scene being photographed by a light-responsive control portion of the device are well known in the art. Such strobes are commonly referred to as quench strobes. In addition to having an independent light-responsive control circuit in the strobe, it is also well known to utilize the exposure control circuit associated with the actual camera apparatus to control the firing and quenching of a strobe unit as is more fully disclosed in U.S. Pat. No. 3,776,112, by Wilwerding issued 1973. Wilwerding discloses a circuit coupled to the light-integrating exposure control circuit of a camera to effect the flash quenching of an electronic flash unit. Thus, it is well known to couple an electronically controlled shutter camera with a quenchable electronic strobe unit so that the strobe unit is quenched simultaneously with the command signal to return the shutter blade elements to their closed position.

Such an arrangement, however, would not be compatible with an exposure control system of the type described in a copending application for U.S. application Ser. No. 619,384 entitled "Exposure Control System With Fill-Flash Race Condition" by Edwin K. Shenk, filed Sept. 30, 1975. The aforementioned exposure control system is utilized in conjunction with a shutter blade arrangement of the so-called "scanning type" which embodies a pair of shutter blade elements, each of which includes a primary aperture therethrough to cooperatively define a gradually varying effective aperture size as a function of the position of the shutter blade elements. Each shutter blade element additionally includes a photocell sweep secondary aperture which apertures also cooperatively define a gradually varying effective secondary aperture in front of the exposure control photocell as a function of blade position. The photocell sweep secondary apertures are generally configured to progressively open ahead of the primary aperture so that the exposure control circuit effects the closing of the shutter blade elements at a time prior to which the film is fully exposed. Prematurely signalling the shutter blade elements to close prior to the time required for a full film exposure anticipates for the additional scene light which will impinge upon the film during the finite time required for the shutter blade elements to fully close. Thus, quenching the strobe solely as a function of the exposure control system command signal to initiate closing of the shutter blade elements as disclosed in U.S. Pat. No. 3,776,112, supra will result in an under-exposure since the strobe is quenched almost instantaneously.

In response to this problem, it has been recently proposed to utilize an additional time delay circuit in conjunction with a quench strobe so that the strobe is quenched subsequent to the expiration of a predetermined time delay subsequent to command signal to close the shutter blade elements of the camera. In this manner, additional illumination is provided to influence the exposure during the shutter blade closing time as would otherwise be provided if the scene were illuminated by normal ambient light or an ordinary flash bulb. Thus, a quench strobe may be used interchangeably with an ordinary flash bulb and the shutter blade closing command signal may be utilized to initiate the time delay after which the strobe is quenched. Various arrangements for such time delay quench strobes are further discussed in United States Applications Ser. No. 684,902 entitled "Time Delay Quench Strobe With Improved Fill-In Flash Performance" filed May 10, 1976 in common assignment herewith, Ser. No. 686,020 entitled "Scene Light Responsive Variable Quench Time Delay For Quench Strobe" filed May 13, 1976 in common assignment herewith, Ser. No. 674,937 entitled "Fixed Time Delay Circuit for Quench Strobe" filed Apr. 8, 1976 in common assignment herewith and Ser. No. 674,840 entitled "Fixed Time Delay Quench Strobe" filed Apr. 8, 1976 in common assignment herewith. Such time delay circuits, although entirely satisfactory in performance, provide an additional circuit complexity to the strobe which would better be eliminated in the interests of economy and simplicity.

Therefore it is a primary object of this invention to provide a quench strobe which may be quenched at a predetermined rate which controls the amount of artificial illumination emitted subsequent to the initial command signal to quench.

It is also an object of this invention to provide a quench strobe with a predetermined quench rate which provides for substantially the same amount of exposure influencing artificial illumination subsequent to the shutter blade closing command signal as would otherwise be provided by a normal generally steady state illuminated scene.

It is a further object of this invention to provide a quench strobe with a predetermined quench rate which tailors the amount of exposure influencing artificial illumination emitted during the time required for the shutter blade elements to return to their closed position to correlate with the amount of extra exposure which is automatically anticipated by the exposure control system of the camera.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

An electronic flash apparatus is provided for use with cameras of the type having an exposure control system wherein the exposure control system provides a blade closing signal in anticipation of the amount of exposure influencing light to be admitted by the blade assembly subsequent to the response of the blade assembly to the closing signal under generally steady state scene lighted conditions. The electronic flash apparatus comprises: an electronic flash tube; a capacitor for energizing the flash tube in order to cause the flash tube to emit light energy;

and trigger means responsive to a first select signal for initiating the discharge of the capacitor through the flash tube in order to energize the flash tube. There are further included means responsive to a second select signal for quenching the energized flash tube by discharging the capacitor at a predetermined rate corresponding directly to the rate at which the light energy emitted by the flash tube is quenched. The quenching means includes a switching element triggerable in correspondence with the second select output signal and a resistive element in series connection with respect to the switching element. The switching element and resistive element are selected to provide, when triggered, a collective impedance which operates to discharge the capacitor at a rate providing for a select amount of additional exposure influencing artificial illumination to be emitted by the flash tube subsequent to the triggering of the switch element. The select additional amount of exposure influencing artificial illumination substantially corresponds to the anticipated amount of exposure influencing light.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein;

DESCRIPTION OF THE PREFERRED EMBODIMENT

Figure 1:
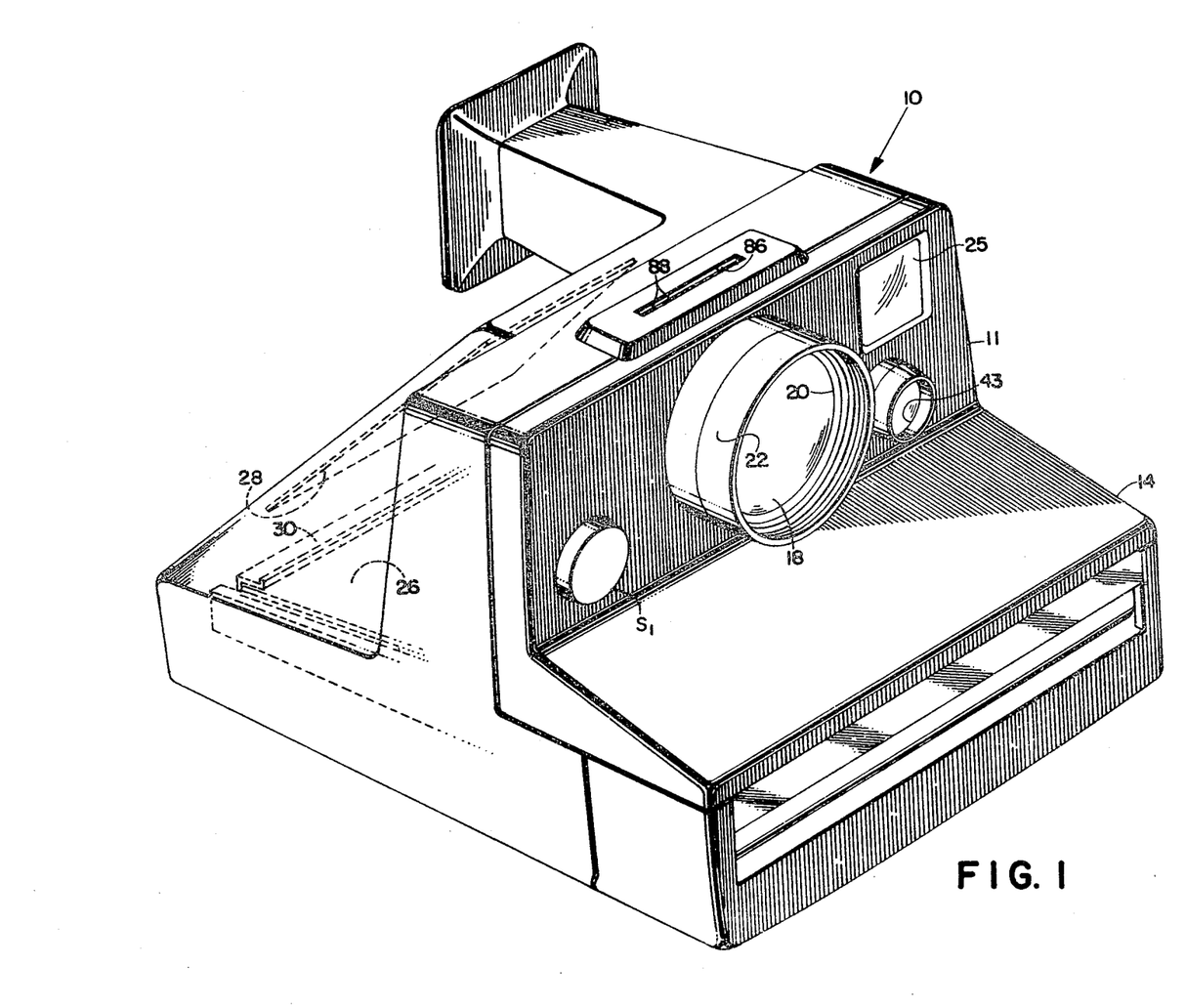
FIG. 1 is a perspective view of a photographic camera apparatus embodying an artificial illumination control system.
Figure 2:
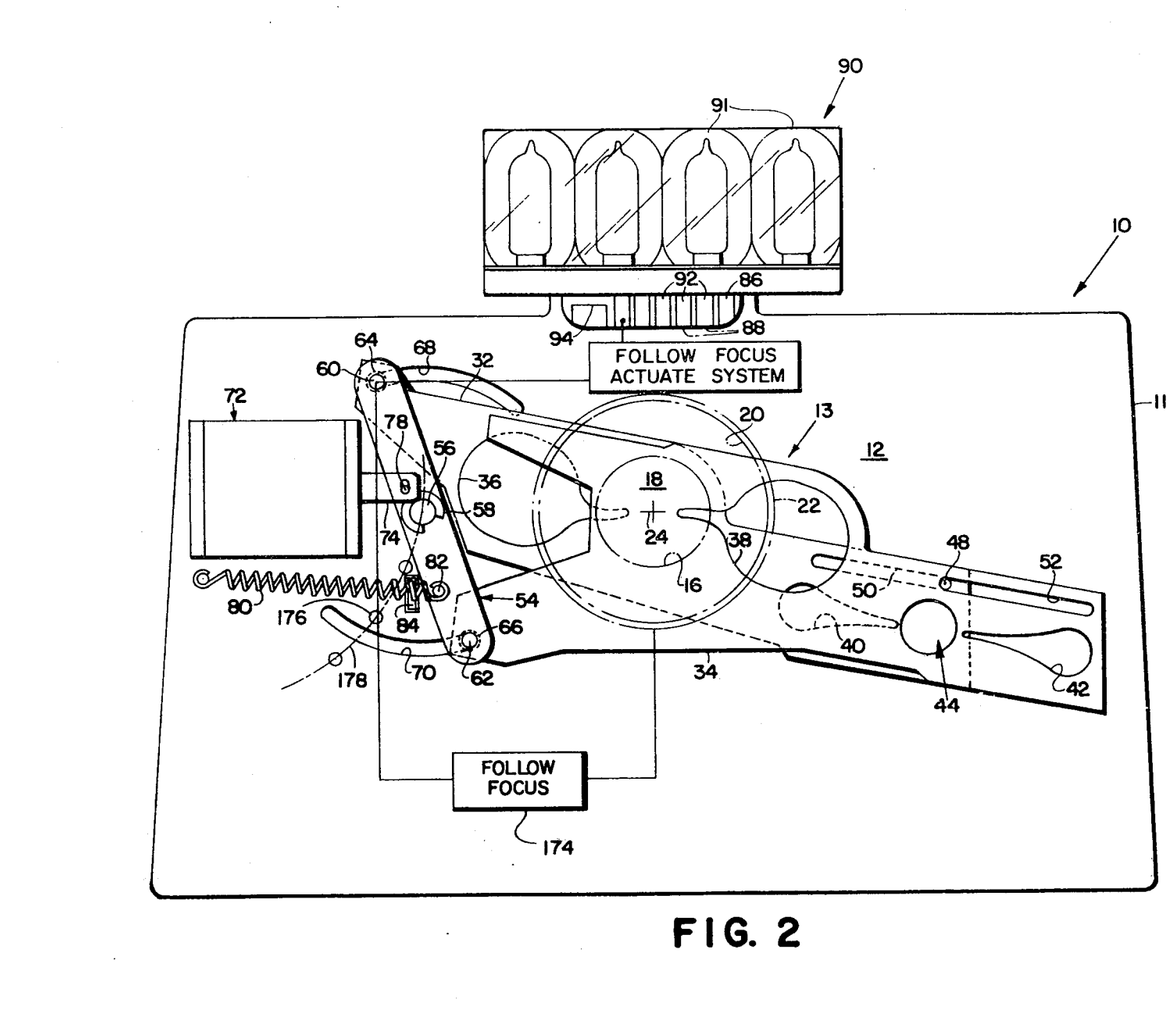
FIG. 2 is a front cross-sectional view of the camera of FIG. 1, showing a portion of a typical exposure control system.

Referring now to FIGS. 1 and 2, it can be seen that the electronic flash control system of this invention is adapted for use with a photographic camera apparatus of the type shown at 10. The camera apparatus 10 is contained within a housing 11 and a baseblock casting 12 is fixedly stationed with the housing 11 and selectively machined to support the various components of an exposure mechanism shown generally at 13. Surrounding the front and top of the baseblock casting 12, there is provided a cover section 14 which includes at least one opening through which extends a manually adjustable focus bezel 22. Centrally disposed within the baseblock casting 12, there is provided a light entering exposure opening 16 which defines the maximum available exposure aperture for the system.

An objective or taking lens 18 is provided in overlying relation to the light entering opening 16 wherein the objective lens 18 may comprise a plurality of elements retained in predetermined spaced relation by a cylindrical lens mount 20 which is externally threaded for toothed engagement within the internally threaded focus bezel 22. As is readily apparent, focus bezel 22 is made rotatable with respect to the front cover 14 to provide translational movement of the elements of lens 18 along the center axis 24 of the optical path of the housing 11. As is readily apparent, the central optical axis 24 is illustrated in FIG. 2 as being normal to the plane of the drawing. Thus, rotation of the focus bezel 22 may be carried out by manual rotation to provide displacement of the elements of objective lens 18 for focusing of image carrying rays through the light entering exposure opening 16 to a rearwardly positioned film plane 26 by way of a reflecting mirror 28 all of which are stationed within a suitable light-tight film exposure chamber 30 within the housing 11.

Intermediate the objective lens 18 and light entering exposure opening 16, there are supported two overlapping shutter blade elements 32 and 34 which will be subsequently described in greater detail herein. Extending from the front cover 14 there is provided a photographic cycle initiating button S1, the depression of which commences the exposure interval by ultimately effecting the release of the shutter blade elements 32 and 34. In addition, there is provided a viewfinder shown generally at 25 which enables a photographer to properly frame the desired scene to be photographed.

A pair of scene light admitting primary apertures 36 and 38 are provided respectively in the blade elements 32 and 34 to collectively define a progressive variation of effective aperture openings in accordance with simultaneous longitudinal and lateral displacement of one blade element with respect to the other blade element in a manner as is fully described in a U.S. Pat. No. 3,942,183 entitled "Camera With Pivoting Blades" by George D. Whiteside, filed July 2, 1974, and assigned in common herewith. The apertures 36 and 38 are selectively shaped so as to overlap the light entering exposure opening 16, thereby defining a gradually varying effective aperture size as a function of the position of the blade elements 32 and 34.

Figure 3:
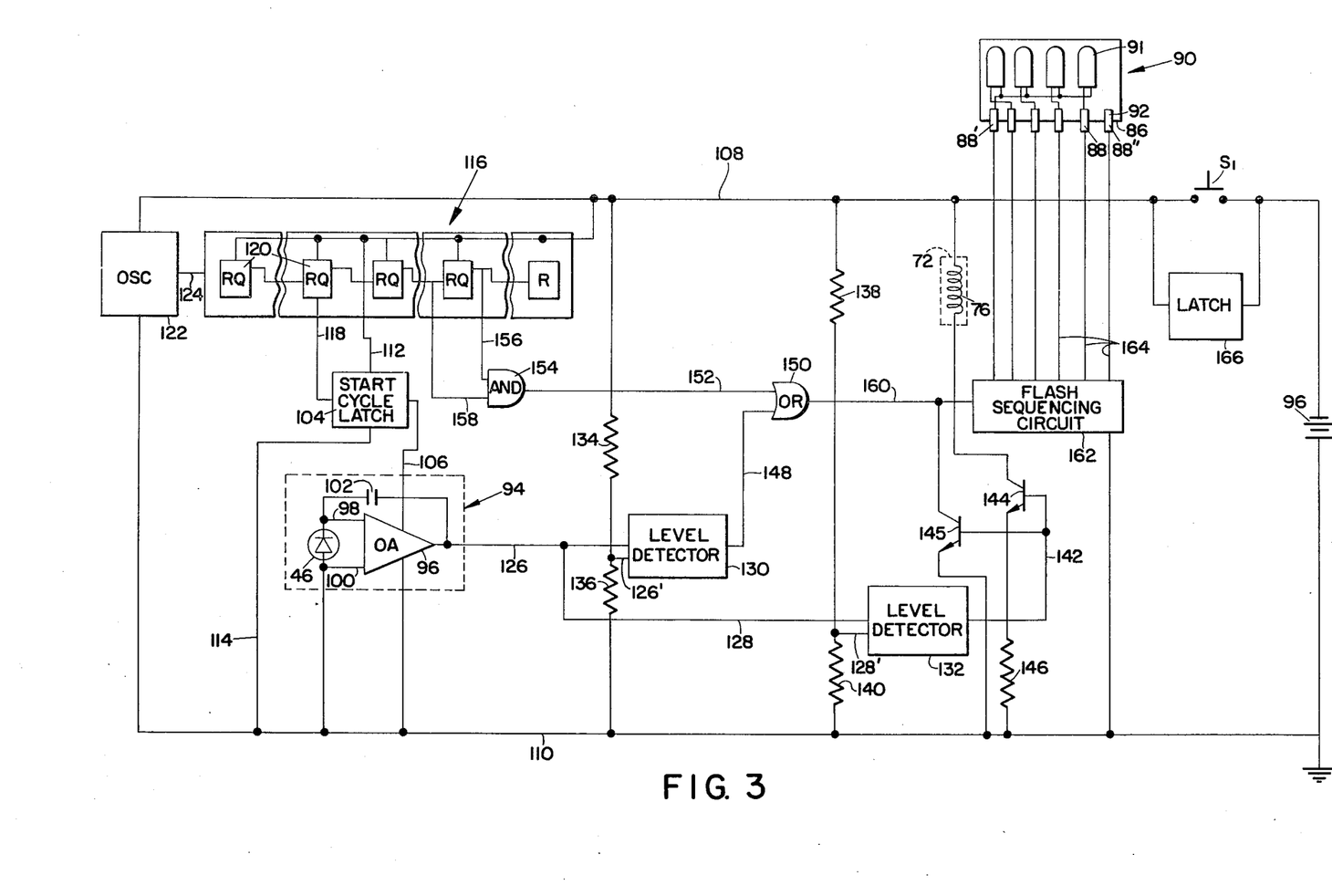
FIG. 3 is a schematic diagram showing a portion of a typical artificial illumination control system.

Each of the blades, 32 and 34, may additionally be configured to have corresponding photocell sweep secondary apertures shown respectively at 40 and 42. Secondary apertures 40 and 42 may be configured in correspondence with the shapes of scene light admitting primary apertures 32 and 34. As is readily apparent, the secondary apertures 40 and 42 also move in correspondence with the primary apertures 36 and 38 to define a small secondary effective aperture for admitting the passage of scene light transmitted through a second opening 43 in the cover 14 from the scene being photographed. Scene light admitted by the photocell secondary apertures 40 and 42 is thereafter directed to a light detecting station shown generally at 44. The light detecting station includes a photoresponsive element 46 which cooperates with light integrating and control circuitry as shown in FIG. 3 to terminate an exposure interval as a function of the amount of light received through the secondary effective aperture defined by the overlapping photocell sweep apertures 40 and 42.

Projecting from the baseblock casting 12 at a location spaced laterally apart from the light entering exposure opening 16, is a pivot pin or stud 48 which pivotally and translatively engages elongate slots 50 and 52 formed in respective shutter blade elements 32 and 34. Pin 48 may be integrally formed with the baseblock casting 12 and blade elements 32 and 34 may be retained in engaging relation with respect to the pin 48 by any suitable means such as peening over the outside end of pin 48.

The opposite ends of the blade elements 32 and 34 respectively include extended portions which pivotally connect to a walking beam 54. Beam 54, in turn, is disposed for rotation relative to the baseblock casting 12 by pivotal connection to a projecting pivot pin or stud 56 which may be integrally formed with the baseblock casting 12 at a location spaced laterally apart from the light entering exposure opening 16. The walking beam 54 may be pivotally retained with respect to the pin 56 by conventional means such as an E ring 58. In the preferred mode, the walking beam 54 is pivotally connected at its distal ends to the shutter blade elements 32 and 34 by respective pin members 60 and 62 which extend laterally outward from the walking beam 54. Pin members 60 and 62 are preferably circular in cross section and extend through respective circular openings 64 and 66 in respective blade elements 32 and 34 so as to slidably engage respective arcuate slots or tracks 68 and 70 which may be integrally formed within the baseblock casting 12. The arcuate tracks 68 and 70 operate to inhibit disengagement of the blade elements 32 and 34 from their respective pin members 60 and 62 during operation of the exposure control system.

A tractive electromagnetic device in the form of a solenoid 72 is employed to displace the shutter blades 32 and 34 with respect to each other and the casting 12. The solenoid 72 includes an internally disposed, cylindrical plunger unit 74 which retracts inwardly into the body of the solenoid upon energization a solenoid coil or winding as shown at 76 in FIG. 3. The solenoid plunger 74 may be affixed to the walking beam 54 by means of a pivot pin or stud 78 such that longitudinal displacement of the plunger 74 will operate to rotate the walking beam around the pivot pin 56 so as to appropriately displace the shutter blades 32 and 34.

The baseblock casting 12 supports the solenoid 72 in a position above a biasing tension spring 80 which operates to continuously urge the blade elements 32 and 34 into positions defining their largest effective aperture over the light entry exposure opening 16. The movable end of spring 80 is attached to walking beam 54 by a pin 82 while the stationary end of spring 80 is grounded with respect to the baseblock casting 12. Thus, with the spring connection herein described, the exposure control system of this invention is biased to continuously urge the shutter blade elements 32 and 34 into a open orientation.

In the present arrangement, the shutter blades 32 and 34 are drawn from their open position to their closed position as shown in FIG. 2 when the solenoid 72 is energized. Consequently, energization of solenoid 72 prevents the shutter blades 32, 34 from moving towards their maximum aperture opening under the urging of spring 80. However, as should be readily understood, the artificial illumination control system of this invention would be equally applicable to photographic systems where the blades 32 and 34 are spring biased in a normally closed position.

Continued energization of the solenoid 72 in order to maintain the shutter blade elements 32 and 34 in their closed positions may result in an undersirable drain in the camera apparatus power source which preferably is an electrical storage battery schematically shown in FIG. 3 at 96. Thus, a mechanical latch as shown generally at 84 may be provided to move into lateral engagement with an edge of the walking beam 54 so as to maintain the blade elements 32 and 34 in their closed position regardless of the energization of solenoid 72. Additional information regarding the structure and operation of the latch 84 is described in an application for U.S. Ser. No. 554,777 entitled "Photographic Apparatus With Sequencing System" by B. K. Johnson, D. Van Allen, and G. D. Whiteside, filed Mar. 3, 1975 in common assignment herewith.

The photographic camera apparatus 10 is adapted for use with a source of artificial illumination of the type which comprises a linear array of flash lamps as shown generally at 90. The linear flash array includes a plurality of individually spaced apart flash lamps 91 which respectively connect to a plurality of spaced apart terminal pads or elements 92. The linear flash array 90 may be releasably connected with respect to the camera housing 11 by way of a receiving socket 86 which also includes a plurality of spaced apart terminal pads or elements 88. The linear flash array 90 may be inserted and withdrawn from the receiving socket 86 in a manner as is fully described in U.S. Pat. No. 3,757,643 entitled "Photoflash Apparatus" by John Burgarella issued Sept. 11, 1973, and assigned in common herewith.

Under conditions of artificial illumination wherein the light has a relatively short duration such as from the individual flash lamps 91 of the linear array 90, the anticipated light level at the camera will depend upon the known characteristics of the flash lamps 91 and upon the distance from the subject being photographed to the light source. When the flash array 90 is mounted on the receiving socket 86, there may be actuated a follow focus system whereby the maximum effective aperture to which the shutter blade elements 32, 34 are allowed to progress is determined in accordance with the distance from the taking lens 18 to the subject being photographed. Thus, as the focus bezel 22 is rotated to provide the correct focus for a particular distance from the photographic apparatus 10 to the subject, a follow focus mechanism (shown generally at 174) moves to appropriately displace a follow focus interceptor pin 176 about its locus of travel as shown by a phantom line 178. The follow focus interceptor pin 176 may be selectively actuated to intercept the edge of walking beam 54 in a well known manner as is more fully described in a U.S. Pat. No. 3,972,057 entitled "Exposure Control System With Follow Focus Capability", by George D. Whiteside filed Mar. 3, 1975, and assigned in common herewith. Thus, as is readily apparent, the walking beam 54 may be intercepted by the follow focus interceptor pin 176 at various locations defining various maximum effective apertures which correspond to the distance from which the subject is spaced from the camera apparatus 10.

Turning now to FIG. 3, there is shown a schematic diagram for an exposure and artificial illumination control circuit including a scene light detecting and integrating circuit shown generally at 94. Circuit 94 includes the photoresponsive element 46 which may be a photovoltaic cell of the type generating an output signal in correspondence with the levels of scene light intensity incident thereon. The photoresponsive element 46 is orientated to evaluate the light levels of a scene coincident with the field of view of the lens system of the camera and operates in conjunction with the above described aperture scanning arrangement which alters the amount of scene light reaching the photoresponsive element 46 in synchronism and corresponding variation with the progressively changing aperture size. The photoresponsive element 46 is coupled with an amplifier stage 96 along input lines 98 and 100 wherein the amplifier 96 is of a type sometimes referred to in the art as an "operational amplifier" which may be of a differential variety preferably fabricated in practical miniaturized form. When considering ideally, the amplifier 96 has infinite gain and infinite input impedance and a zero output impedance.

By virtue of a feedback path comprising an integration capacitor 102 connected between the input line 98 and an output line 126 from the operational amplifier 96, the photoresponsive element 46 is permitted to operate into an apparent low-input impedance so as to function in a current mode, the current generated by the photoresponsive element 46 being limited substantially only by its own internal impedance. Thus, under such loading, the photoresponsive element 46 in conjunction with the operational amplifier 96 and capacitor 102 is capable of providing an desirable linear output corresponding to the time integration of scene light intensity incident to the photoresponsive element 46.

Any difference of potential supplied by the photoresponsive element 46 across input leads 98 and 100 causes a voltage to be produced at output line 126. The relatively low signal voltages at the input of amplifier 96 which are present with the relatively low signal current from the photoresponsive element 46 are acted upon by the correspondingly high gain characteristic of the amplifier. Thus, although the amplifier 96 has a very high input impedance, the photoresponsive element 46, when connected in the circuit described, experiences only a very low impedance. Therefore, the current output of the photoresponsive element 46 is directed into the feedback path.

The initial charging of the integration capacitor 102 is synchronized with shutter blade actuation by means of a start cycle latch circuit shown generally at 104 which provides an output actuation signal to the operational amplifier 96 by way of interconnecting line 106. The start cycle latch circuit 104 is connected to the supply line 108 and ground line 110 by way of lines 112 and 114 respectively and is made responsive to the output signal from a ripple counter 116 by way of an interconnecting line 118. The ripple counter 116, in turn, comprises a plurality of serially connected binary circuits 120, each of which can provide an output control signal in a predetermined time sequence as is well known in the art. Binary circuits 120 may be ordinary "flip flops" interconnected in serial relation with respect to each other whereby the binary count rate is determined by an oscillator circuit 122 connected thereto by way of a line 124.

The output signal from the light detecting and integrating circuit 94 at line 126 is directed to a pair of level detector circuits 130 and 132 by way of interconnecting lines 126 and 128 respectively wherein level detector 130 controls the "fill flash" function to be subsequently described. Each level detector 130 and 132 may be of any conventional design such as a Schmitt Trigger. As is readily apparent, the steady state reference voltage to the level detector 130 is established by biasing means comprising a first resistor 134 connected between the supply line 108 and the input line 126' together with a second resistor 136 connected between the input line 126' and the ground line 110. In like manner, the steady-state reference voltage level to the detector 132 is established by biasing means comprising a third resistor 138 connected between the supply line 108 and the input line 128' and a fourth resistor 140 connected between the input line 128' and the ground line 110.

The output signal from detector 132 is directed to the base of an NPN transistor 144 by way of an interconnecting line 142. The collector of transistor 144, in turn, is connected to the supply line 108 by way of the solenoid winding 76, while the emitter of transistor 144 is connected to the ground line 110. The output signal from the level detector circuit 130 is directed to an OR gate 150 by way of line 148. The output from the OR gate 150 in turn is directed by way of an interconnecting line 160 to a flash sequencing circuit 162 which will be more fully described in the following discussion. The flash sequencing circuit 162 operatively connects to the linear flash array 90 upon the insertion thereof into the flash array receiving socket 86. The operative connection is made possible by the plurality of spaced apart terminal pads or elements 88 in the receiving socket 86, which elements are electrically connected to the flash sequencing circuit 162 by way of lines 164 respectively. Thus, insertion of the linear flash array 90 within the receiving socket 86 operates to bring the terminal elements 92 into respective electrical connection with the terminal elements 88. The flash sequencing circuit 162 thereafter operates to sequentially ignite the individual flashlamps.

A second input signal to the OR gate 150 is derived from an AND gate 154 by way of an interconnecting line 152. The AND gate 154, in turn, receives an output signal from the ripple counter 116 by way of lines 156 and 158. As is now readily apparent, the output signal from the AND gate 154 is timed to occur at a predetermined interval subsequent to the actuation of the start cycle latch 104, which coincides to the initiation of the actual exposure interval period.

Figure 4:
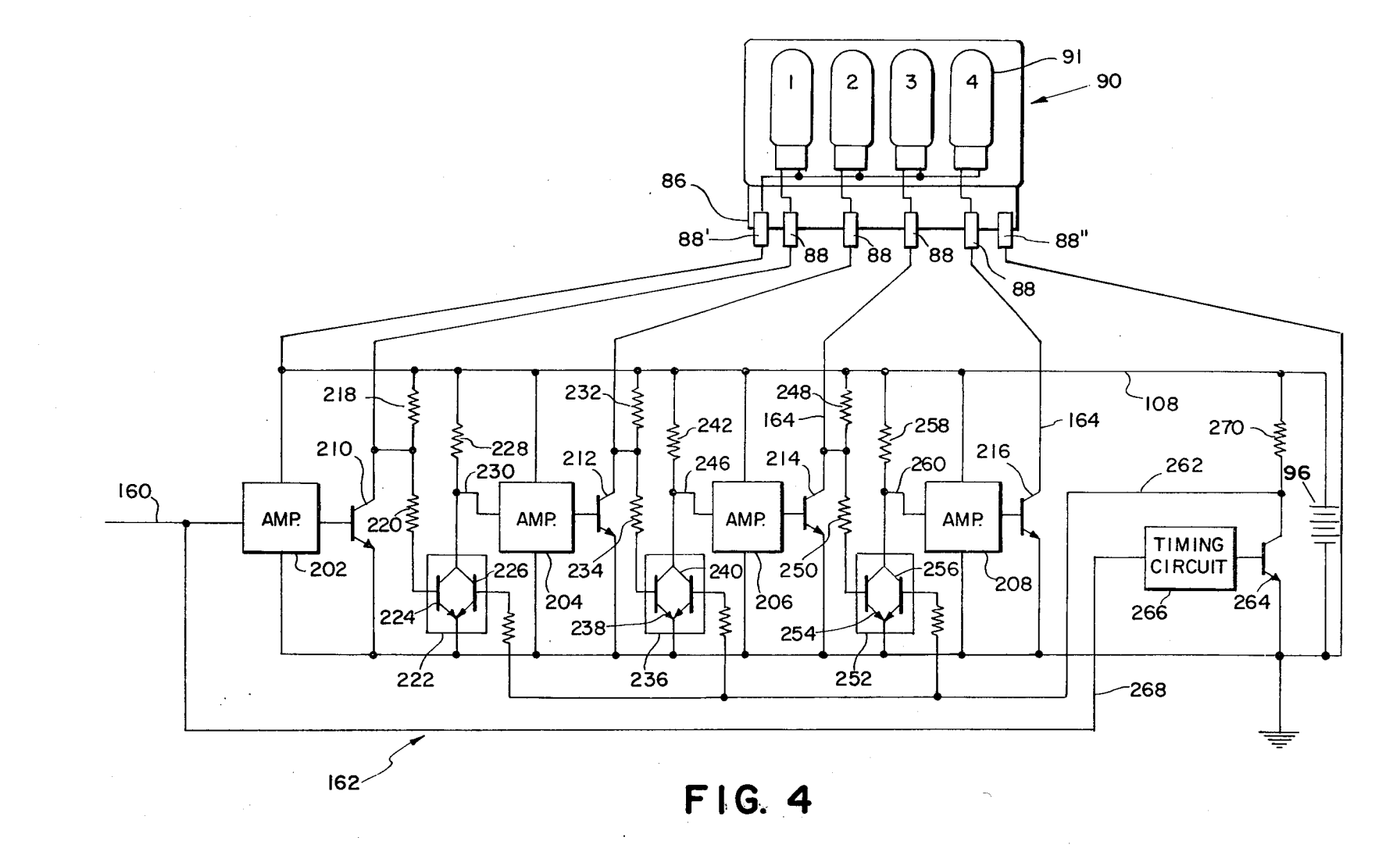
FIG. 4 is a schematic diagram showing, in greater detail, a portion of the artificial illumination control system of FIG. 3.

Referring now to FIG. 4 there is shown in detail the flash sequencing circuit 162, which comprises a plurality of amplifiers 202, 204, 206 and 208 arranged in serial relationship to respectively drive a plurality of NPN output transistors 210, 212, 214 and 216. The collector terminal of each output transistor, 210 through 216, respectively connects to an output terminal 88. The collector terminal of transistor 210 additionally connects to both the supply line 108 by way of an interconnecting resistor 218 and to a latching circuit, shown generally at 222, by way of another interconnecting resistor 220. The latching circuit 222 preferably comprises two NPN transistors 224 and 226, connected in common grounded emitter mode. The collector terminals of transistors 224 and 226 are also in common connection, with respect to the input line 230 of amplifier 204.

In like manner, the collector terminal of output transistor 212 is connected to both the supply line 108 by way of an interconnecting resistor 232 and to the input line of a second latching network 236 by way of another interconnecting resistor 234. Latching network 236 also comprises two NPN transistors, 238 and 240, connected in common grounded emitter mode. The collector terminals of transistors 238 and 240 are also in common connection to both the supply line 108 by way of an interconnecting resistor 242 and to the input line 246 of amplifier 206. In like manner, the collector terminal of transistor 214 connects to both the supply line 108 by way of an interconnecting resistor 248 and to the input of a third latching network 252 by way of another interconnecting resistor 250. The latching network 252 comprises two NPN transistors, 254 and 256, connected in common grounded emitter mode. The collector terminals of transistors 254 and 256 are also in common connection with respect to both the supply line 108 by way of an interconnecting resistor 258 and to the input terminal of amplifier 208 by way of an input line 260.

The base terminals of transistors 226, 240 and 256 connect to the collector terminal of an NPN transistor 264 by way of a common line 262. The collector of transistor 264 in turn is connected to the supply line 108 by way of a resistor 270. Transistor 264 is controlled through a timing circuit 266, which in turn is controlled from the input line 160 by way of an interconnecting line 268.

Thus, as is now readily apparent, insertion of the linear flash array 90 into the flash array receiving socket 86 operates to bring one terminal from each flash lamp 91 into respective electrical contact with a terminal element 88 in the flash array receiving socket. The other terminal elements from the flash lamps 91 are in common electrical connection with respect to each other and are connected to the supply line 108 by way of terminal element 88'. Also, as should be readily apparent, although the flash sequencing circuit 162 is shown as having terminal elements sufficient to accommodate a linear flash array having four flash lamps 91, more or less terminal elements 88 may be included in the flash sequencing circuit 162 to accommodate respectively for more or less individual flash lamps 91 in the linear flash array 90.

Subsequent to the insertion of the linear flash array 90 within the flash array receiving socket 86, a low ambient light intensity photographic exposure interval may be commenced upon the depression of the photographic exposure interval initiating button S1. As will become readily apparent, the operational sequence for the various embodiments of the exposure control system of this camera are described in relation to a photographic camera of the nonsingle lens reflex type, although the intended scope of the invention is by no means so limited and cameras of the well-known reflex type as described in U.S. Pat. No. 3,672,281 entitled "Reflex Camera" by E. H. Land may be equally suitable for use with the electronic flash control system of this invention.

Thus, closure of switch S1 operates to simultaneously move the latch 84 out of engagement with the edge of the walking beam 54 in a manner fully described in U.S. application Ser. No. 554,777, supra, as well as to energize the exposure control circuitry of FIG. 3. Disengagement of the latch 84 from the edge of the walking beam 54 permits tension spring 80 to rotate the walking beam 54 in a clockwise direction as viewed in FIG. 2. In this manner, the shutter blade elements 32 and 34 are moved from an initial closed arrangement in directions which operate to progressively enlarge the effective aperture over the light entry exposure opening 16. As should be readily understood, in cameras of the single lens reflex type, the blade elements must first be closed, and thereafter move from this initial closed arrangement to define an exposure interval. The rotation of the walking beam 54 effects simultaneous linear and angular displacement of the shutter blade elements 32 and 34 about pivot pin 48, so that photocell sweep secondary apertures 40 and 42 simultaneously define a corresponding progressively enlarging effective aperture opening over the photoresponsive element 46.

As is readily apparent, a battery supply voltage across lines 108 and 110 will be maintained only as long as the operator maintains switch S1 in its depressed state, which may be perfectly adequate for situations where the human reaction time in depressing and releasing the switch S1 substantially exceeds the longest exposure time likely to be incurred. However, in situations where the normal exposure time is likely to exceed the human reaction time in depressing and releasing switch S1, there may be provided a latch circuit, as shown generally at 166, in parallel connection with respect to the switch S1, for maintaining continuous energization of the exposure control circuit even after the release of the switch S1. A suitable automatic latch circuit is more fully described in U.S. Pat. No. 3,744,385 entitled "Control System for Photographic Apparatus", by Burgarella, et al. issued July 10, 1973 and assigned in common herewith.

Preferably, insertion of the linear flash array 90 within the flash array receiving socket 86 also operates to actuate the follow focus mechanism 174 so as to move the interceptor pin 176 into the walking beam 54 locus of travel. As previously discussed, rotation of the focus bezel 22 to focus the objective lens 18 also operates to move the interceptor pin 176 along the phantom line 178. Thus, the maximum effective aperture to which the shutter blade elements 32 and 34 may be progressively opened is limited by the point of interception of the pin 176 with the edge of the walking beam 54.

The photoresponsive element 46 provides an appropriate voltage response corresponding to the scene light intensity incident thereon, which voltage response is thereafter integrated by the operational amplifier 96 and feedback capacitor 102 to provide an output signal representative of the time integration of the scene light intensity incident to the photoresponsive element 46. Under conditions of low ambient scene light intensity, the output signal representative of the time integration of the scene light intensity incident to the photoresponsive element 46 will fail to reach the signal level required to trigger the level detector 132 prior to the time required for the shutter blade elements to reach their follow focus setting. Thus, after a sufficient time elapses, during which the scene light intensity remains inadequate to trigger the level detector 132, the ripple counter 116 then provides positive output signals at lines 156 and 158 to switch the AND gate 154 and provide an output signal at line 152 to the OR gate 150. The OR gate 150, in turn, switches to provide a flash igniting signal to the flash sequencing circuit 162 by way of the interconnecting line 160.

Referring now to FIG. 4, it can be seen that a flash igniting signal is first applied to amplifier 202, which in turn drives transistor 210 into full conduction so as to effect the firing of the first flash lamp 91 in the linear flash array 90. The flash igniting signal at line 160 additionally triggers a timing circuit 266 so as to turn on transistor 264 and thereby simultaneously turn off transistors 226, 240 and 256. In this manner, the latching networks 222, 236 and 252 are temporarily disabled to permit the energization of the first flash lamp 91. As the first flash lamp 91 is burned, its impedance increases so as to drive transistor 210 further into saturation and thereby start to turn transistor 224 off. However, prior to the turning off of transistor 224, which would ultimately turn on transistor 212 by way of amplifier 204, timing circuit 226 operates to turn off transistor 264, in turn, turning on transistors 226, 240 and 256 of respective latching networks 222, 236 and 252. Thus, as is now readily apparent, simultaneously turning on the latching networks 22, 236 and 252 operates to inhibit any further firing of the flash lamps 91.

A subsequent reoccurrence of the flash igniting signal at line 160 in the course of another photographic exposure cycle will again operate to drive transistor 210 hard into saturation so as to turn off transistor 224 of latching network 222. Transistors 226, 240 and 256 of respective latching networks 222, 236 and 252 are again turned off in the aforementioned manner by way of transistor 264 and timing circuit 266. Thus, with both transistors 224 and 226 of latching network 222 turned off, amplifier 204 is actuated to drive transistor 212 thereby firing the second flash lamp 91 in the linear flash array. Again, as is readily apparent, continued firing of the second flash lamp 91 results in a substantial increase in its impedance so as to drive transistor 212 further into saturation thereby ultimately turning off transistor 238. However, prior to this occurrence, transistor 240 is again turned on by transistor 264 and timing circuit 266 thereby latching amplifier 206 off. In this manner, each flash lamp 91 may be sequentially fired until the last flash lamp is fired by way of transistor 216.

As should now be readily apparent, the requisite output signals at lines 156 and 158 to fire a flash lamp 91, occur at a predetermined time period, subsequent to the initiation of an exposure interval. The predetermined time period is selected to be at least as long as the longest time required for the shutter blade elements 32 and 34 to reach their maximum aperture defining position when the taking lens 18 is focused to infinity. As should also now be readily apparent, focusing lens 18 at infinity operates to move the follow focus interceptor pin 176 to the largest effective aperture defining position to which the shutter blade elements 32 and 34 can possibly move. In this manner, the shutter blade elements 32 and 34 will always be at rest at their maximum aperture defining position upon energization of the flash array 90.

Subsequent to the energization of an individual flash lamp 91, there will occur a rapid rise in the time integration of the scene light intensity incident to the photoresponsive element 46. The steady state input voltage reference level to the detector circuit 132 is biased by the resistors 138 and 140 to establish the predetermined value to which the input signal at line 126 must increase in order to trigger the level detector 132. Thus, the light intensity is integrated until reaching a predetermined value corresponding to a select film exposure, at which point the level detector circuit 132 is triggered into an abrupt change of state at the output line 142, from a generally low value which is insufficient to maintain the transistor 144 in conduction, to a substantially higher current level of sufficient value to turn on the transistor 144 and thus establish a current flow from collector to emitter through the transistor 144. Turning on the transistor 144, in turn, operates to energize the solenoid winding 76 to retract the plunger unit 74 so as to rotate the walking beam 54 in a counter-clockwise direction, as viewed from FIG. 2, against the biasing force of tension spring 80, thereby moving the shutter blade elements into their closed position. A second transistor 145 is also turned on by the level detector 132 simultaneously with transistor 144 so as to effectively ground the flash igniting signal at line 160 for reasons which will become apparent from the following discussion. After the walking beam 54 is rotated to its full counter-clockwise position, the latch 84 may be automatically moved into intercepting relation with the edge of the walking beam so as to permit the deenergization of the solenoid in a manner as is more fully described in U.S. application Ser. No. 554,777, supra. In this manner the exposure interval is terminated.

In situations where the ambient light intensity levels are relatively high, but portions of the photographic subject are relatively dark, the photographic apparatus is capable of operating in a so-called "fill-in flash" mode of operation to provide supplementary illumination in a manner as is more fully described in a copending Application for U.S. application Ser. No. 619,384, entitled "Exposure Control System With Fill Flash Race Condition" by Edwin K. Shenk, filed Sept. 30, 1975. However, under conditions of increased levels of ambient light intensity, the film may receive its correct exposure prior to the aforementioned predetermined time period, in which case the level detector 132 will energize the solenoid winding 76 and retract the solenoid plunger 74 prior to the time in which a flash lamp 91 would otherwise be energized. Thus, alternate means are provided for triggering energization of a flash lamp 91 under conditions of relatively high ambient light intensity where the exposure interval would likely be terminated prior to the predetermined delay period.

The "fill-in flash" mode of operation is commenced in the previously described manner upon the depression of the photographic exposure interval initiating button S1, which operates to simultaneously move the latch 84 out of engagement with the walking beam 54 as well as to energize the control circuit of FIG. 3. Disengagement of the latch 84 from the edge of the walking beam 54 permits the tension in spring 80 to rotate the walking beam 54 in a clockwise direction as viewed in FIG. 2 so as to initiate the exposure interval and permit the shutter blade elements 32 and 34 to approach their maximum aperture defining position as limited by the follow focus interceptor pin 176. As a result of the increased ambient scene light intensity, the time integration of the scene light intensity incident to the photoresponsive element 46 proceeds substantially more rapidly than that for the previously discussed lower ambient scene light intensity situation. The steady state reference voltage signal level to the detector circuit 132 is biased by the resistors 138 and 140 to be above the predetermined value required to trigger the "fill-in flash" level detector 130. As is readily apparent, the predetermined trigger value for the detector 130 is selected to be below the predetermined trigger value for the level detector 132 and preferably is only approximately 30% of the predetermined trigger value required to switch detector 132. The output voltage signal from the light detecting and integrating circuit 94 at line 126 will now operate to trigger the level detector 130 and thereby change the output signal therefrom at line 148, from a generally low value, to a substantially higher current level of sufficient value to switch the OR gate 150. The output signal at line 160 from the OR gate 150, in turn, is utilized to energize an appropriate flash lamp 91 through the flash sequencing circuit 162 in the aforementioned manner.

As is readily apparent, the linear flash array 90 is now energized at a time prior to which the flash lamp would otherwise have been energized by the output signals at lines 156 and 158 from the ripple counter 116. The sudden increase in light intensity attributable to the energization of a flash lamp 91 thereafter operates to precipitate a rapid increase in the value of the time integration of the scene light intensity. Thus, in the same manner as previously described, the output voltage signal of the light detecting and integrating circuit 94 approaches a value corresponding to the select film exposure, at which point the level detector 132 is triggered to energize the solenoid winding 76. The shutter blade elements 32 and 34 are thereafter returned to their closed positions, terminating the exposure interval.

After the walking beam 54 is rotated to its full counter-clockwise position, the latch 84 may be automatically moved into intercepting relation with the edge of the walking beam so as to permit the deenergization of the solenoid as previously discussed.

As is now readily apparent, a race condition is established between the level detector 130 and the ripple counter 116, so that under extremely low levels of ambient scene light intensity, the ripple counter 116 will operate to initiate the energization of a respective flash lamp 91 at a predetermined time period subsequent to the initiation of the exposure interval. Under conditions of substantially higher ambient scene light intensity, the level detector 130 will operate to initiate the energization of a respective flash lamp 91 as a consequence of the time integration of the scene light intensity to the photoresponsive element 46 reaching a predetermined value. In this manner, the flash illumination control system may be automatically operated in both a normal flash mode of operation and in a "fill-in flash" mode of operation without regard to any external switches or buttons which would otherwise have to be actuated by the photographer. It should also be readily understood that if a respective flash lamp 91 is energized as a consequence of the level detector 130 being triggered prior to the predetermined time delay established by the ripple counter 116, then the subsequent output signal from the ripple counter 116 will operate only to switch the output signal at line 152 from the AND gate 154, but have no effect on the output signal at line 160 from the OR gate 150. The system as so far described was previously disclosed in the U.S. application Ser. No. 619,384, supra.

While flash lamps are perfectly satisfactory sources of artificial illumination, it should be understood that other sources of artificial illumination such as an electronic flash (strobe) would also be highly desirable for use with the aforementioned exposure control system. It is toward this end that the instant invention is directed.

Electronic photographic flash or strobe devices of the type in which the flash light produced by the flash tube or the device is automatically terminated after a predetermined quantity of light has been received from the scene being photographed by a light-responsive controlled portion of the device, are known in the art. Such strobes are commonly referred to as quench strobes. In addition to having an independent light-responsive controlled circuit in the strobe, it is also well known to utilize the exposure control circuits associated with the actual camera apparatus to control the firing and quenching of a strobe unit. The strobe fire signal may be generated in the identical manner as the previously described flash fire signal, however, whereas the ignitation of an ordinary flash lamp is not quenched, additional means must be provided to quench the actual firing of a strobe. Toward this end, it is well known to couple an electronically controlled shutter camera with a quenchable electronic strobe unit so that the strobe unit is quenched simultaneously with the command signal to return the shutter blade elements to their closed position.

Such an arrangement, however, would not be compatible with the exposure control system herein described, due to the photocell sweep secondary apertures 40 and 42 being configured to progressively open ahead of the primary apertures 36 and 38, so that the control circuit prematurely triggers the solenoid to energize prior to the time in which the film is fully exposed. Prematurely triggering the shutter blades to close prior to the time required for full time exposure anticipates for the additional scene light incident to the film resulting from both shutter blade over-shoot and the finite time required for the shutter blade elements to close. Thus, quenching the strobe solely as a function of the command signal to close the shutter blade elements will result in an under-exposure since the strobe is quenched instantaneously and does not provide artificial light during the time required for the opening momentum of the shutter blade elements to be overcome by the solenoid (blade overshoot) and for the shutter blade elements to be thereafter returned to their closed position, as is the case for an ordinary flash lamp.

Hence, it has been proposed to use an additional time delay circuit as more fully discussed in a copending U.S. application Ser. No. 674,840 entitled "Fixed Time Delay Quench Strobe" filed Apr. 8, 1976 in common assignment herewith, in conjunction with a quench strobe so that both the quench strobe and linear flash array 90 can be used interchangeably with the socket 86. However, such a time delay circuit may prove to be an unnecessary complexity in view of the simplified electronic flash control system of the invention to be hereinafter described.

Figure 5:
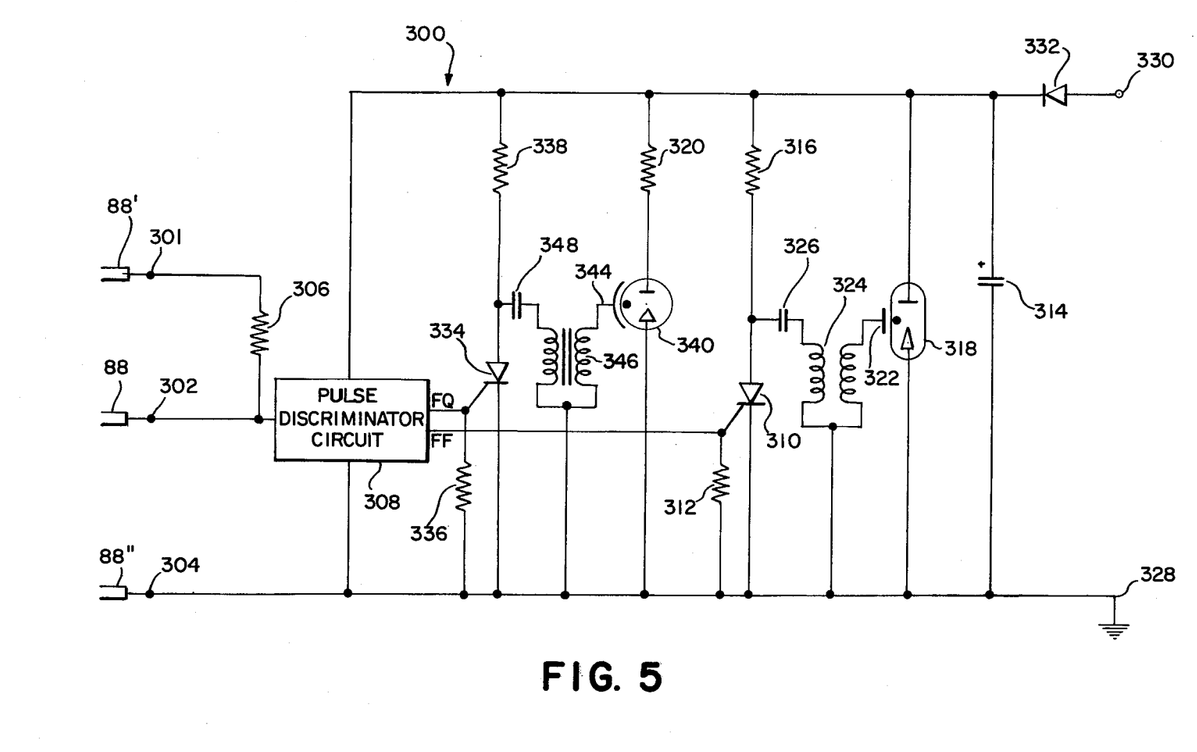
FIG. 5 is a schematic diagram showing the strobe circuit of this invention.

Referring now to FIG. 5 there is shown a schematic diagram for the electronic flash control system of this invention which comprises a quench strobe circuit 300 which may be utilized directly in conjunction with the flash sequencing circuit 162 without an intervening time delay circuit as suggested in U.S. Pat. application Ser. No. 674,840, supra. The quench strobe circuit 300 may include three inputterminal elements 301, 302 and 304 adapted to connect respectively to the terminal elements 88', 88 and 88'' in the receiving socket 86. Across the input terminals 302 and 301, there is provided a resistor 306 having an impedance characteristic corresponding with the predetermined characteristic of one of the flash lamps 91. Resistor 306 is provided for reasons fully explained in U.S. Pat. No. 3,858,227 entitled "Adaptor Apparatus for Flash Firing System" by Seymour Ellin et al., issued Dec. 31, 1974.

The input terminal 302 also connects to a pulse discriminator circuit 308 which has two output terminals for providing respectively a flash fire signal at terminal FF and a flash quench signal at terminal FQ in a manner as will be subsequently more fully discussed. The flash fire output terminal FF connects to the gate electrode of a silicon controlled rectifier 310 which gate electrode is additionally grounded by way of a resistor 312. The anode terminal of SCR 310, in turn, connects to the positive terminal of a storage capacitor 314, by way of an interconnecting resistor 316. In parallel connection with respect to the storage capacitor 314, there is provided a flash light producing tube 318. A light triggering terminal 322 of the flash tube 318 is coupled through a transformer 324 to one terminal of a capacitor 326. The other terminal of capacitor 326 is connected to the anode terminal of the SCR 310. Terminals 328 and 330 are provided for connection to the usual capacitor charging means which is not shown in FIG. 5. Such capacitor charging means are well known in the art, and it is sufficient to say that the capacitor 314 is only maintained in a charged state by the aforementioned capacitor charging means whereby a relatively high voltage is maintained across the capacitor 314. Terminal 330 connects to the anode terminal of a diode 332 with the cathode terminal thereof connecting directly to the capacitor 314.

Referring now to the flash quench output terminal FQ, it can be seen to connect to the gate electrode of a second silicon controlled rectifier 334 which gate electrode is also grounded by way of a resistor 336. The anode terminal of SCR 334, in turn, also connects to the positive terminal of the storage capacitor 314 by way of an interconnecting resistor 338. A serially connected quench tube 340 and resistor 320 are provided in parallel connection with respect to both the storage capacitor 314 and flash tube 318. The significance of resistor 320 will be made more apparent from the following discussion. A triggering terminal 344 of the quench tube 340 is coupled through a transformer 346 to one terminal of a capacitor 348. The other terminal of capacitor 348 is connected to the anode terminal of the SCR 334.

Under conditions where the ambient scene light intensity is sufficient to provide an adequate film exposure, the quench strobe 300 may be used in place of the linear flash array 90 to provide artificial scene illumination. Insertion of the terminals, 301, 302 and 304 within the flash array receiving socket 86 may also operate to actuate the follow focus mechanism 150 so as to move the interceptor pin 146 into the walking beam 54 locus of travel as previously discussed. Preferably, terminal elements 301 and 302 from the quench strobe circuit 300 are brought into respective electrical contact with the terminal elements 88' and 88 from the flash sequencing circuit 162. In addition, the ground terminal element 304 is brought into electrical contact with terminal element 88' from the flash sequencing circuit 162. Whereas terminal element 302 may ideally connect to either one or all of the terminal elements 88 from the flash sequencing circuit 162, it is preferred that terminal element 302 electrically connect to the last terminal element 88 from transistor 216 for reasons which are too complex to be further discussed herin, but which are readily apparent from U.S. Pat. No. 3,558,227, supra.

Subsequent to the insertion of the terminal elements 301, 302 and 304 from the quench strobe circuit 300 into the flash array receiving socket 86, a low ambient light intensity photographic exposure interval may be commenced upon the depression of the photographic exposure interval initiating button S1. Closure of switch S1 operates to simultaneously move the latch 84 out of engagement with the edge of the walking beam 54 as well as the energized the exposure control circuitry of FIG. 3 in the above described manner. Thus, the shutter blade elements 32 and 34 are permitted to move in directions which operate to progressively enlarge the effective aperture over the light entering exposure opening 16. Rotation of the walking beam 54 effects a simultaneous linear and angular displacement of the shutter blade elements 32 and 34 about pivot pin 48 so that photocell sweep secondary apertures 40 and 42 simultaneously define a corresponding progressively enlarging aperture opening over the photoresponsive element 46.

The photoresponsive element 46 again provides an appropriate voltage responsive corresponding to the scene light intensity incident thereon, which voltage response is thereafter integrated by the operational amplifier 96 and feedback capacitor 102 to provide an output signal representative of the time integration of the scene light intensity incident to the photoresponsive element 46. As is now readily apparent, the low ambient light intensity remains substantially constant during the time required for the shutter blade elements to reach their follow focus setting and for a predetermined period thereafter at which time the ripple counter 116 provides positive output signals at lines 156 and 158 to switch the AND gate 154 and provide a positive output signal at line 152 to the OR gate 150. The OR gate 150, in turn, switches to provide a positive flash igniting signal to the flash sequencing circuit 162 by way of interconnecting line 160. Referring now to FIG. 5, it can be seen that the resistor 306, having an impedance characteristic corresponding with the predetermined impedance characteristic of an unfired flash lamp, is effectively connected between the terminal element 88' and the terminal element 88 from the collector of transistor 216. Thus, a high input signal level at line 160 will operate to turn on transistor 216 in a manner as previously described.

Referring now to the quench strobe diagram of FIG. 5 it can be seen that the turning on of transistor 216 from the flash sequencing circuit 162 operates to signal the pulse descriminator circuit to provide a positive flash fire signal at its FF terminals and hence thereby rendering the SCR 310 conductive. When the SCR 310 becomes conductive, a lower resistance discharge path is presented across the capacitor 326 which causes the capacitor to dump its charge so as to trigger the flash tube 318. As the flash tube 318 begins to conduct, the voltage on the high voltage terminal 330 may be reduced as the charge on the capacitor 314 is dumped through the flash tube 318.

Subsequent to the firing of flash tube 318, there is again incurred a rapid rise in the time integration of the scene light intensity incident to the photoresponsive element 46. As previously discussed, the steady state input voltage reference level to the detector circuit 132 is biased by the resistors 138 and 140 to establish the predetermined value to which the input signal at line 126 and 128 must increase in order to trigger the level detector 132. Thus, the light intensity is integrated until reaching the predetermined value at which point the level detector circuit 132 is triggered into an abrupt change of state at the output line 142, from a generally low signal value which is insufficient to maintain the transistors 144 and 145 in conduction, to a substantially higher current level of sufficient value t turn on the transistors 144 and 145. Turning on the transistor 144, in turn, operates to energize the solenoid winding 76 to retract the plunger unit 74 so as to rotate the walking beam 54 in a counter-clockwise direction, as viewed from FIG. 2, against the biasing force of tension spring 80, thereby moving the shutter blade elements into their light blocking closed position. After the walking beam 54 is rotated to its full counter-clockwise position, the latech 84 may be automatically moved into intercepting relation with the edge of the walking beam so as to permit the deenergization of solenoid in the above described manner.

Turning on transistor 145 operates to effectively ground the input signal at line 160 to the flash sequencing circuit 162. Effectively grounding the input signal at line 160, in turn, operates to turn transistor 216 off thereby signaling the pulse discriminator circuit 308 to provide a positivee flash quench signal FQ to the gate electrode of SCR 334. With the positive flash quench signal FQ, a current will flow into the gate electrode of SCR 334 thereby rendering it conductive. When the SCR 334 becomes conductive, a lower resistance path is presented across the capacitor 34B which causes the capacitor to dump its charge. That action induces a triggering signal to appear at the quench tube triggering terminal 344 thereby initiating conduction in the quench tube 340. The dumping of the charge on the capacitor 348 produces a ringing action through the circuit comprising the capacitor 348, the SCR 334, and the transformer 346. That ringing action is effective to turn off the SCR 334 after the quench tube triggering signal has been provided. After being triggered, the quench tube 340 ad resistor 320 conduct more heavily than the flash tube 318 and thereby discharge the storage capacitor 314 at a predetermined rate as determined by the collective impedance of the quench tube 340 and resistor 320. The residual charge on the capacitor 314 is thus dissipated at a controlled rate until reaching a point where the voltage is insufficient to support ionization in either the quench tube 340 or the flash tube 318 at which time both tubes will cease to conduct. The charging circuit (not shown) connected to the terminals 328 and 330 will then begin to recharge the capacitor 314 in anticipation of another exposure cycle.

Thus, it can be seen that the light energy from the flash tube 318 is quenched or extinguished at a predetermined rate directly corresponding to the rate at which the capacitor 314 is discharged through the reisitor 320 and quench tube 340 subsequent to the triggering of level detector 132 and the energization of the solenoid winding 72 to retract the shutter blade elements to their closed position. The predetermined quench rate as determined by the collective impedance of the quench tube 340 and resistor 320 is selected so that the additional exposure influencing illumination emitted from the quench strobe subsequent to the triggering of detector 132 to close the shutter blades closely approximates the additional exposure influencing light which would otherwise be expected to be admitted by the shutter blade subsequent to the triggering of the detector 132 when photographing a generally steady state illuminated scene. The term "steady state" as used herein includes both ambient as well as ordinary flash bulb lit scenes. In addition, the term "exposure influencing illumination or light" designates the actual exposing light incident to the film plane as determined by both scene light intensity and aperture size. In this manner, the predetermined quench rate is effectively correlated to the aforementioned anticipation characteristic of the photocell secondary apertures 40 and 42 which accommodates for the additional scene light admitted through the primary apertures 36 and 38 during the time required for the shutter blade elements to move to their close position. The value of the resistor 320 may typically. be in the order of 0.25 to 1.0 ohms.

Figure 6A:
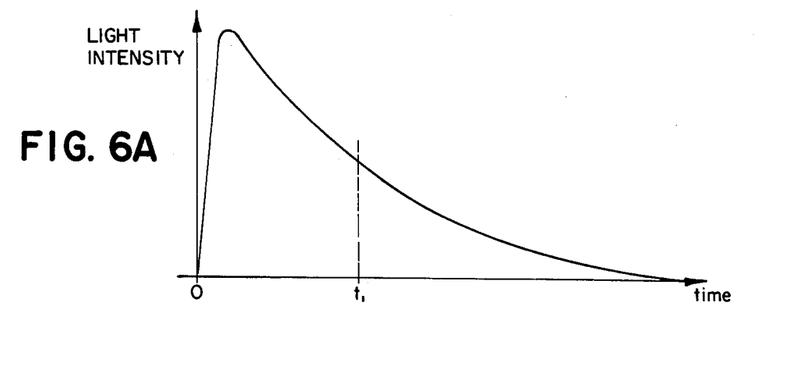
FIGS. 6A-6C graphically illustrate the light intensity versus time curves for various types of strobes including the strobe circuit of FIG. 5.
Figure 6B:
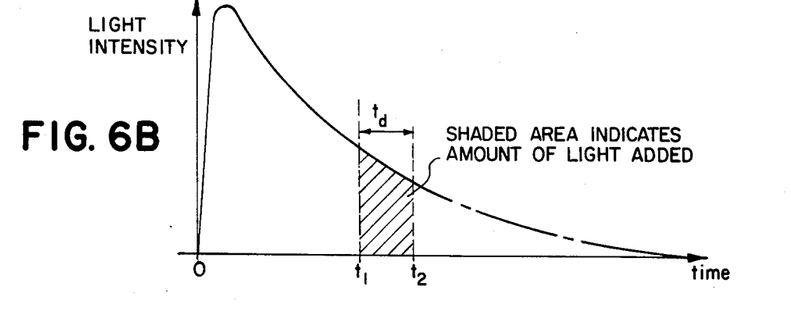
Figure 6C:
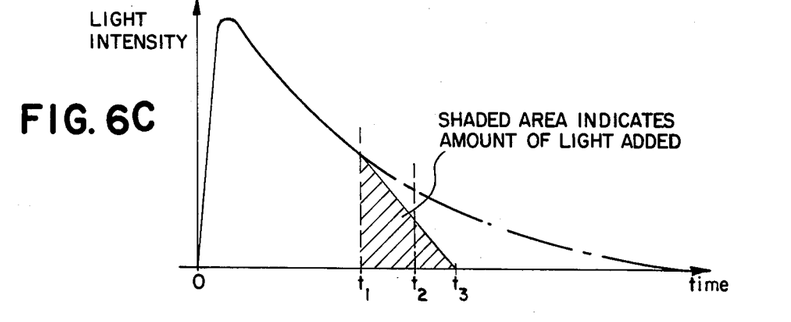

Referring now to FIGS. 6A - 6C, there may be better seen a graphical comparison between the levels of light intensity versus time for: a strobe having no quench, a strobe having a time delayed quench as disclosed in U.S. application Ser. No. 674,840, supra, and a strobe having a predetermined quench rate as determined by a resistor in series with a quench tube in accordance with this invention. Referring to FIG. 6A there is shown the light intensity curve for a strobe having no quench where T1 represents the instant that level detector 132 is triggered to close the shutter blades. As is readily apparent, triggering the shutter blade equivalent to the cross hatched area under the curve of FIG. 6B so as to achieve the same effect of a time delay quench strobe in a simple manner without incurring the additional complexity of a time delay circuit.

The camera and strobe are also capable of operating in the aforementioned "fill-in flash" mode of operation to provide supplementary illumination in situations where the ambient scene light intensity levels are relatively high. Thus, the "fill-in flash" mode of operation is commenced in the previously described manner upon the depression of the photographic exposure interval initiating button S1 which operates to release the walking beam 54 and to energize the control of FIG. 3 in the aforementioned manner. The shutter blade elements 32 and 34 are moved by the tension spring 80 toward their maximum aperture defining position as limited by the follow focus interceptor pin 176. As a result of the increasing ambient light intensity, the time integration of the scene light intensity incident to the photoresponsive element 46 proceeds substantially more rapidly than that for the previously discussed lower ambient scene light intensity situation. Thus, the output voltage signal from the light detecting and integrating circuit 94 at line 126 will operate to cause the level detector 130 to trigger and thereby change the output signa therefrom at line 148 from a generally low value to a substantially higher current level of sufficient value t switch the OR gate 150. The output signal at line 160 from the OR gate 150, in turn, operates to flash the flash tube 318 through the flash sequencing circuit 162 as previously discussed. Subsequent triggering of the level detector 132 as a result of the increased scene light from the flash tube 406 will thereafter operate to quench the strobe in the aforementioned manner.

It should be readily understood that although the strobe circuit 300 has been shown and described as having terminal elements insertable within the flash array receiving socket 86, it may alternatively be provided as an integral part of the cameral control circuit.

In addition, the quench tube 340 may also be substituted with other switching elements such as a thyristor.

Since certain changes may be made in the above described system and apparatus without departing from the scope of the invention herein involved, it is intended that all matter contained, this scription thereof, or shown in the accompanying drawings shall be interpreted as illustrated and not in a limiting sense.

What is claim is:

1. A photographic camera apparatus comprising
   a housing;
   an electronic flash tube;
   a capacitor for energizing said flash tube to cause said flash tube to emit light energy;
   trigger means responsive for a first select output signal for initiating the discharge of said capacitor through said flash tube thereby energizing said flash tube;
   means for mounting an objective lens on said housing;
   means associated said housing for receiving a source of electrical energy;
   means within said housing for defining a film exposure plane;
   a blade assembly mounted and arranged within said housing for displacement from an initial closed arrangement, wherein said assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane;

scene light detecting means energizable by the source of electrical energy for providing an output signal in correspondence to the amount of scene light detected subsequent to the commencement of an exposure interval;

means, at least in part energizable by the source of electrical energy, for initiating the displacement of said blade assembly from its said initial closed arrangement towards its said second arrangement thereby commencing said exposure interval and for providing said first select output signal to trigger the discharge of said capacitor through said flash tube subsequent to the intiating of the exposure interval, and then responsive to said output signal of said scene light detectingmeans reaching a predetermined value, for effecting the displacement of said blade assembly into its final closed arrangement in anticipation of the amount of exposure influencing light which is admitted by said blade assembly before reaching said final closed arrangement under generally steady state scene lighted conditions and for providing a second select output signal; and means responsive to said second select output signal for quenching said energizing flash tube by discharging said capacitor at a predetermined rate corresponding directly to the rate at which the light energy emitted by said flash tube is quenched, said discharging means including a switching element triggerable in correspondence with said second select output signal and a resistive element in series connection with respect to said switching element, said switching element and resistive element exhibiting, when triggered, a collective impedance which operates to discharge said capacitor at a rate providing for a select amount of exposure influencing artificial illumination to be emitted by said flash tube subsequent to the initial appearance of said second select output signal, said select amount of exposure influencing artificail illumination substantially corresponding to said amount of exposure influencing light which is admitted by said blade assembly subsequent to said scene light detecting means reaching said predetermined value under generally steady state scene lighted conditions.

2. The photographic apparatus of claim 1 wherein said switching element is a quench tube.

3. An electronic flash apparatus for use with cameras of the type having an exposure control system wherein the exposure control system provides a blade closing signal in anticipation of the amount of exposure influencing light to be admitted by the blade assembly subsequent to the response of the blade assembly to the closing signal under generally steady state scene lighted conditions, said electronic flash apparatus comprising:

an electronic flash tube;

a capacitor for energizing said flash tube in order to cause said flash tube to emit light energy;

trigger means responsive to a first select signal for initiating the discharge of said capacitor through said flash tube thereby energizing said flash tube; and means responsive to a second select signal for quenching said energized flash tube by discharging said capacitor at a predetermined rate corresponding directly to the rate at which the light energy emitted by said flash tube is quenched, said quenching means including a switching element triggerable in correspondence with said second select output signal and a resistive element in series connection with respect to said switching element, said switching element and resistive element being selected to exhibit when triggered, a collective impedance which operates to discharge said capacitor at a rate providing for a select amount of additional exposure influencing artificial illumination to be emitted by said flash tube subsequent to the triggering of said switch element, said select additional amount of exposure influencing artificial illumination substantially corresponding to the anticipated amount of exposure influencing light.

4. The electronic flash apparatus of claim 3 wherein said switching element is a quench tube.

5. An electronic flash apparatus for use with cameras of the type having an exposure control system wherein the exposure control system provides a blade closing signal in anticipation of the amount of exposure influencing light to be admitted by the blade assembly subsequent to the response of the blade assembly to the closing signal under ambient scene lighted conditions, said electronic flash apparatus comprising;

an electronic flash tube;

a capacitor for energizing said flash tube in order to cause said flash tube to emit light energy;

trigger means responsive to a first select signal for initiating the discharge of said capacitor through said flash tube thereby energizing said flash tube; and means responsive to a second select signal for quenching said energized flash tube by discharging said capacitor at a predetermined rate corresponding directly to the rate at which the light energy emitted by said flash tube is quenched, said quenching means including a switching element triggerable in correspondence with said second select output signal and a resistive element in series connection with respect to said switching element, said switching element and resistive element being selected to exhibit when triggered, a collective impedance which operates to discharge said capacitor at a rate providing for a select amount of additional exposure influencing artificial illumination to be emitted by said flash tube subsequent to the triggering of said switch element, siad select additional amount of exposure influencing artificial illumination substantially corresponding to the anticipated amount of exposure influencing light.

6. The electronic flash apparatus of claim 5 wherein said switching element is a quench tube.

7. An electronic flash apparatus for use with cameras of the tupe having an exposure control system wherein the exposure control system provides a blade closing signal in anticipation of the amount of exposure influencing light to be admitted by the blade assembly subsequent to the response of the blade assembly to the closing signal under ordinary flash bulb scene lighted conditions, said electronic flash apparatus comprising;

an electronic flash tube;

a capacitor for energizing said flash tube in order to cause said flash tube to emit light energy;

trigger means responsive to a first select signal for initiating the discharge of said capacitor through said flash tube thereby energizing said flash tube; and means responsive to a second select signal for quenching said energized flash tube by discharging said capacitor at a predetermined rate corresponding directly to the rate at which the light energy emitted by said flash tube is quenched, said quenching means including a switching means triggerable in correspondence with said second select output signal and a resistive element in series connection with respect to said switching element, said switching element and resistive element being selected to exhibit when triggered, a collective impedance which operates to discharge said capacitor at a rate providing for a select amount of additional exposure influencing artificial illumination to be emitted by said flash tube subsequent to the triggering of said switch element, said select additional amount of exposure influencing artificial illumination substantially corresponding to the anticipated amount of exposure influencing light.

8. The electronic flash apparatus of claim 7 wherein said switching element is a quench tube.

* * * * *